United States Patent [19]

Chur

[11] Patent Number: 5,589,771
[45] Date of Patent: Dec. 31, 1996

[54] MAGNETIC MEDIA HEAD DYNAMIC TESTING APPARATUS AND METHOD WHICH OPERATE BY DEFORMING A LOCALIZED PORTION OF MAGNETIC MEDIA TOWARD THE HEAD ELEMENT

[75] Inventor: Sung P. Chur, Palo Alto, Calif.

[73] Assignee: Swan Instruments, Inc., Santa Clara, Calif.

[21] Appl. No.: 328,062

[22] Filed: Oct. 24, 1994

[51] Int. Cl.⁶ ........................................... G01R 33/12
[52] U.S. Cl. .............. 324/212; 360/130.31; 360/130.32; 324/210
[58] Field of Search .................... 324/210, 211, 324/212, 262; 29/603.01; 360/103, 105, 104, 109, 75, 31, 130.3, 130.31, 130.32

[56] References Cited

U.S. PATENT DOCUMENTS

| | | | |
|---|---|---|---|
| 3,699,430 | 10/1972 | Kruklitis | 324/210 |
| 3,706,926 | 12/1972 | Barrager et al. | 324/210 |
| 3,846,906 | 11/1974 | Case | 29/603 |
| 4,504,871 | 3/1985 | Berwick et al. | 360/31 |
| 4,747,006 | 5/1988 | Miwa et al. | 360/130.3 |
| 4,902,971 | 2/1990 | Guzik et al. | 324/212 |
| 5,031,055 | 7/1991 | Yanagisawa | 360/103 |
| 5,254,946 | 10/1993 | Guzik | 324/262 |

FOREIGN PATENT DOCUMENTS

| | | | |
|---|---|---|---|
| 0283065 | 12/1986 | Japan | 360/130.3 |

OTHER PUBLICATIONS

R. C. Treseder, "Video Buffer", Oct. 1968, IBM Technical Disclosure Bulletin, vol. 11, No. 5.

*Primary Examiner*—Louis M. Arana
*Assistant Examiner*—Jay M. Patidar
*Attorney, Agent, or Firm*—Bradley T. Sako; Raymond E. Roberts; Michael J. Hughes

[57] ABSTRACT

A method and apparatus (10, 410) for testing magnetic media read/write head components such as a head element bar (46) and a slider assembly (546). The component to be tested is held in a head bar holding assembly (44) or an alternate head holding assembly (544), and positioned with a head gross positioning assembly (18) or a head fine positioning assembly (16) over a localized portion (50) of a flexible magnetic medium (28) which is caused to spin in relation to a stabilizer plate (20) by a media spin motor (28). The localized portion (50) is deformed to bring the localized portion (50) of the flexible magnetic medium (28) into proximity with the component under test.

17 Claims, 4 Drawing Sheets

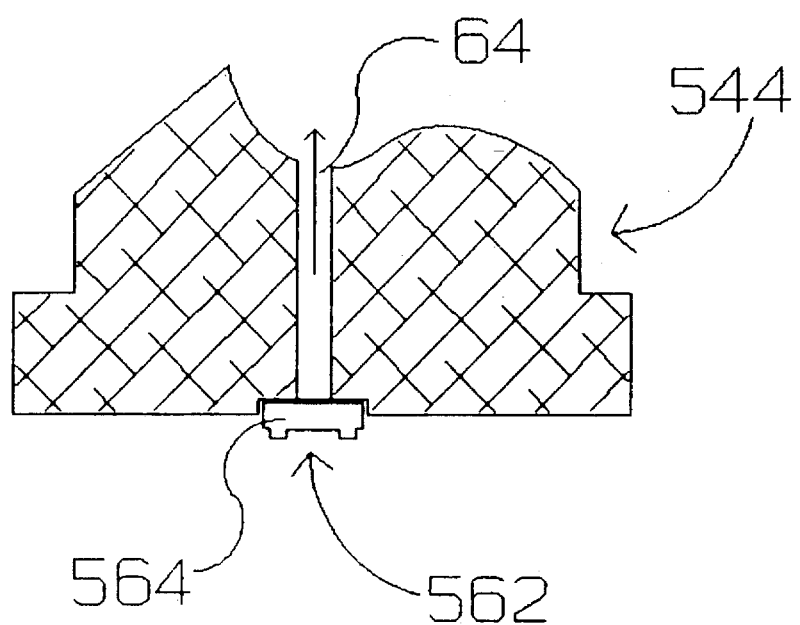

MAGNETIC MEDIA HEAD DYNAMIC TESTING APPARATUS AND METHOD WHICH OPERATE BY DEFORMING A LOCALIZED PORTION OF MAGNETIC MEDIA TOWARD THE HEAD ELEMENT

TECHNICAL FIELD

This invention relates generally to testing systems for magnetic media read/write head elements, and more particularly to systems and methods for testing, prior to final assembly of disk drive units, of read/write head elements intended for fixed disk magnetic media drives.

BACKGROUND ART

The manufacture of magnetic read/write heads for magnetic media data storage devices requires that the head be processed through a number of successive operations. For example, the heads may be produced as a wafer, divided first into bars and then into individual head elements with the head elements being formed into "slider" assemblies. The slider is then mounted, with corresponding suspension appendages and bonding wires, on a Head Gimble Assembly ("HGA"). The HGA includes a suspension for enabling the read and write elements to fly over a disk drive surface. The HGA is installed into the disk drive, where the head is tested in conjunction with other components of the disk drive. Each of these procedural steps adds additional manufacturing costs.

Due to the extremely tight tolerances which such heads must achieve for use with today's high density hard disk media, end of process testing of the head assemblies reveals a significant number of defective or unacceptable devices. Therefore, it would be desirable to be able to test the heads during the manufacturing process such that, at each such process step, those heads which were defective could be discarded and no expense would be incurred in further processing such defective heads. It is also significant that the head elements may become damaged during any of the previously discussed manufacturing operations, and so it might also be desirable to test the head elements at more than one stage in the overall manufacturing process. Of course, since there is cost involved in the testing process itself, in order to be cost effective, any such test must be easily and quickly performed and further must not, itself, be a significant cause of damage to the head elements.

The above problems being recognized in the industry. There have been several attempts to provide testing facilities for less than totally assembled head elements. For example, a head tester is disclosed in U.S. Pat. No. 3,699,430, issued to Kruklitis. The Kruklitis invention utilizes a rotating drum with a strip of magnetic recording material thereon. However, although the Kruklitis invention is well suited for some head devices, due to the close proximity to the media required by hard disk heads and the high speed at which the media is moved in hard disk assemblies, this invention will not effectively duplicate the conditions under which a fixed disk head element will be required to operate.

To the inventor's knowledge, prior successful attempts at producing a testing means for less than fully assembled fixed disk heads have all involved subjecting the element to be tested to a variable magnetic field produced by a stationary field source. An example of such a "static" head testing device is found in U.S. Pat. No. 3,706,926, issued to Barrager et al., which patent discloses a method for testing batch fabricated heads. The device of that patent applies a test magnetic field to the head under test by way of an adjacent conductive strip, or an adjacent inductive magnetic head driven by a current. Such tests have achieved the objective of being relatively easy and relatively harmless to the element under test. However, such tests are also clearly less than optimal in that such a "static" test may not accurately predict the characteristics of the head element as the head is required to write to and/or to read from moving magnetic media, as will be required of the finished head assembly.

It has been understood in the field that static testing, as described previously herein, is less accurate than is "dynamic" testing, wherein a head is tested actually reading and/or writing to moving media. Nevertheless, the static test has been thought to be an optimal compromise since, prior to the present invention, it has been thought that dynamic testing of an unmounted head element would be too difficult or too costly given that the necessarily close proximity of the head to a rapidly rotating disk medium would require slow and careful positioning of each head (a time consuming and, therefore, costly proposition), and further would be likely to frequently damage heads and/or the expensive hard disk medium.

To the inventor's knowledge, either the idea of using a floppy disk to test a hard disk head had not previously occurred, or else it had been summarily dismissed, given that those skilled in the art will readily recognize that a floppy disk could not, prior to the present invention, achieve the necessary stability in the necessarily close proximity to a head under test at the required rotational speed (even using the known stabilizer plate which is currently used in the industry in some applications as a stabilizer for rotating floppy disks at higher the usual rotational speeds). This is particularly true since the apparatus for holding the hard disk heads (or head bars, or the like) would be necessarily quite massive compared to a simple floppy disk head assembly, and thus would tend to interfere with the stability of the floppy disk when brought into close proximity. Indeed, the hard disk heads, or head bar assemblies, or the like would themselves become a cause of instability of the floppy disk when brought into close proximity thereto.

To the inventor's knowledge, no cost effective prior art means for dynamically testing fixed disk head elements prior to final assembly has been produced. All such test means have either been of the static type or else have been unsuitable or cost ineffective for use with fixed disk head elements.

DISCLOSURE OF INVENTION

Accordingly, it is an object of the present invention to provide a head element tester that records and tests several critical parameters of head element performance.

It is another object of the present invention to provide a means for dynamically testing a head element prior to mounting the element into an HGA.

It is yet another object of the present invention to provide a testing means which can quickly and easily test head elements.

It is still another object of the present invention to provide a head element tester that is inexpensive to produce and maintain.

It is yet another object of the present invention to provide a test which will not damage the head elements.

It is still another object of the present invention to provide a head element tester which can provide dynamic testing to head elements at a plurality of stages of the head manufacturing operation.

Briefly, the preferred embodiment of the present invention is a dynamic tester configured for testing a head element bar, the head element bar consisting of a plurality of undivided head elements. The head element bar is mounted in a fixture wherein a flexible "floppy" disk medium is rotated at a high speed in relation to the head element. In order to provide the close spacing required between the medium and the head element, a stabilizer plate is provided adjacent to the floppy disk opposite the head element. A positioning pin projects through the stabilizer plate to urge a localized portion of the floppy disk into the correct position in relation to the head element. In the preferred embodiment of the invention, the floppy disk medium is removed from actual contact with the positioning pin by compressed air which is provided through the positioning pin.

An equally preferred alternate embodiment of the invention allows the pin to come into contact with the medium. Another disclosed variation of the invention is configured to test head elements which have been configured into slider assemblies rather than undivided head elements in the form of head bars.

An advantage of the present invention is that it enables an accurate test of a head element prior to incurring the cost of mounting the slider into an HGA.

Another advantage of the present invention is that it enables a head to be tested after it is configured as a slider and before it is installed in a disk drive assembly.

Still another advantage of the present invention is that head elements can be dynamically tested while still joined into a head bar.

Yet another advantage of the present invention is that it enables dynamic testing of head elements without substantial risk to the elements, and without risk to an expensive hard disk medium.

Still another advantage of the present invention is that it will generally not harm any head elements.

A further advantage of the present invention is that it is quick and easy to use.

These and other objects and advantages of the present invention will become clear to those skilled in the art in view of the description of the best presently known modes of carrying out the invention and the industrial applicability of the preferred embodiment as described herein and as illustrated in the several figures of the drawing.

BRIEF DESCRIPTION OF THE DRAWING

FIG. 5 is a cross sectional view, similar to the view of FIG. 3, showing an alternate head holding assembly according to the present invention.

BEST MODE FOB CARRYING OUT THE INVENTION

Figure 1:
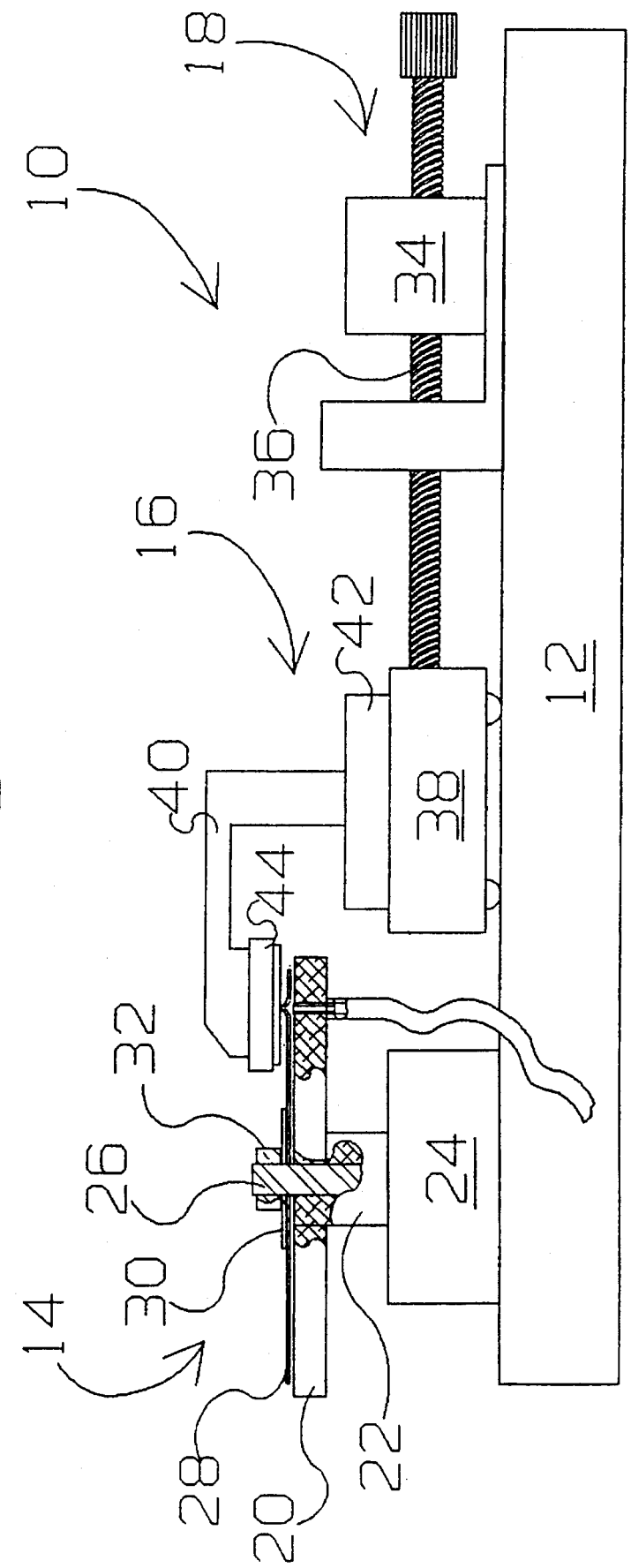
FIG. 1 is a partially cut away side elevational view of the preferred embodiment of the present invention.

The best presently known mode for carrying out the invention is a testing apparatus employing the inventive test method for determining the functionality and operating characteristics of a head element bar, the head element bar having thereon a plurality of individual head elements. The predominant expected usage of the inventive magnetic media head dynamic testing apparatus is in the mass production of rigid disk drives wherein accurate testing of head prior to final drive assembly will greatly reduce overall costs associated with the production of "bad" drives. The presently preferred embodiment of the inventive magnetic media head dynamic testing apparatus is illustrated in a partially cut away side elevational view in FIG. 1, and is indicated therein by the general reference character 10.

The magnetic media head dynamic testing apparatus 10 has a flat table 12 whereon are located a media assembly 14, a head fine positioning assembly 16 and a head gross positioning assembly 18. The media assembly 14 has a stabilizer plate 20 mounted on a stabilizer plate base 22. A media spin motor 24 rotates a media drive shaft 26, which media drive shaft 26 passes through the stabilizer plate base 22 and the stabilizer plate 20 as depicted in FIG. 1. A flexible magnetic medium 28 is secured to the media drive shaft 26 between the stabilizer plate 20 and an upper media collar 30 using a media drive nut 32, such that the flexible magnetic medium 28 rotates with the media drive shaft while the stabilizer plate 20 remains stationary in relation to the flat table 12. In the best presently known embodiment 10 of the present invention, the flexible magnetic medium is a conventional 3½ inch floppy disk medium, although it is envisioned that larger or smaller diameter media (or media of other than non-standard thicknesses) might be appropriate to different applications.

The head gross positioning assembly 18 has a positioning motor 34 for rotating a threaded shaft 36 in precise increments such that a movable platform 38 is moved toward or away from the media drive shaft 26 according to the direction of rotation of the threaded shaft 36. The head fine positioning assembly 16 has a head positioning arm 40 with a piezo fine positioning mechanism 42 interposed between the movable platform 38 and the head positioning arm 40. The piezo fine positioning mechanism 42 is a conventional device used for positioning the head positioning arm 40 within the very small increments of movement provided by the positioning motor 34. A head bar holding assembly 44 is affixed to the head positioning arm 40, as shown in the view of FIG. 1.

Figure 2:
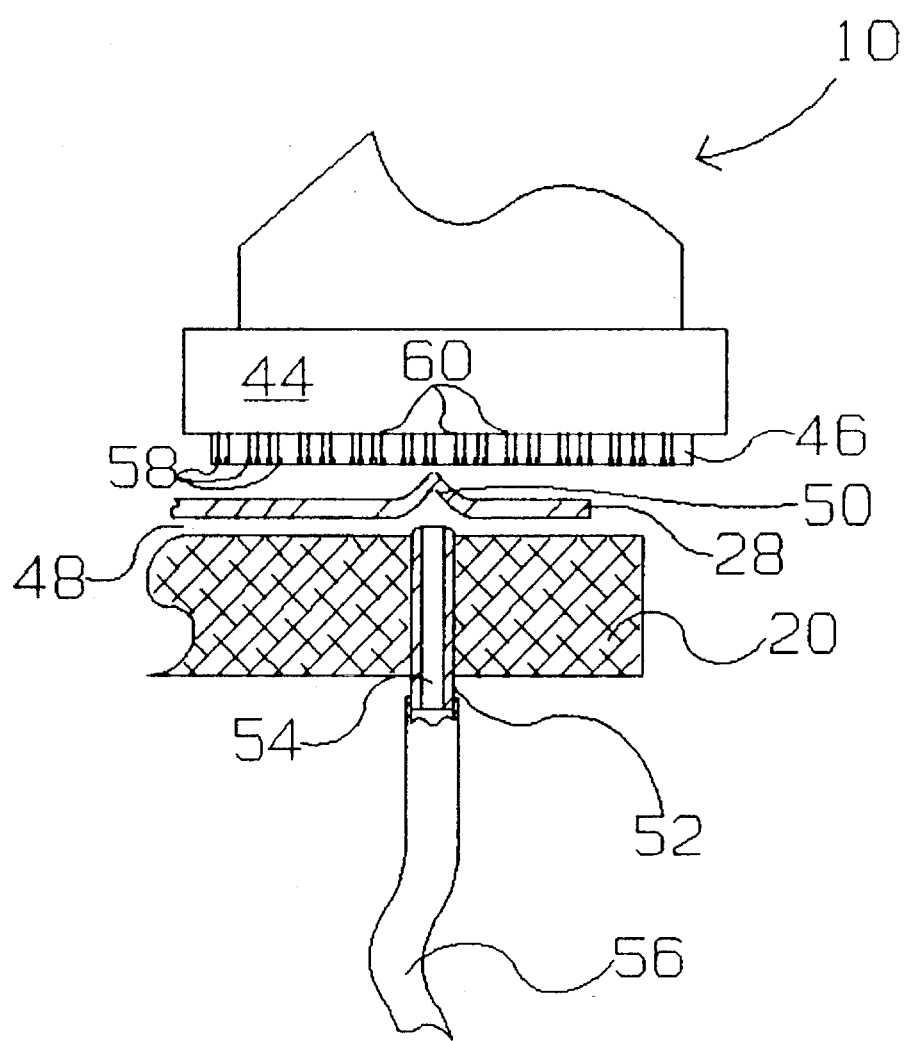
FIG. 2 is a partially cut away side elevational view of a portion of the embodiment of the present invention as depicted in FIG. 1, showing in detail the head bar holding assembly.

FIG. 2 is a partially cut away side elevational view of a portion of the best presently known embodiment 10 of the present invention, showing in greater detail the head bar holding assembly 44 and closely associated portions of the invention. In the view of FIG. 2 it can be seen that a head element bar 46 is positioned on the head bar holding assembly 44. The configuration depicted in FIG. 2 is shown with the flexible magnetic media 28 rotating at high speed about the media drive shaft 26 (FIG. 1) in relation to the stabilizer plate 20 since, as will be discussed in greater detail hereinafter, the flexible magnetic medium 28 would otherwise not be as shown in FIG. 2. As one skilled in the art will recognize, when the flexible magnetic medium 28 spins as described herein an air bearing 48 will be formed between the flexible magnetic medium 28 and the stabilizer plate 20, causing the flexible magnetic medium 28 to tend to maintain a fixed distance overall from the stabilizer plate 20. Indeed, the inventor has found the tendency of the flexible magnetic medium 28 to maintain its distance from the stabilizer plate 20 under such conditions is sufficiently great that a localized portion 50 of the flexible magnetic medium 28 can be deformed away from the stabilizer plate 20 without substantially affecting the stability of the flexible magnetic medium 28 or the distance between the flexible magnetic medium 28 and the stabilizer plate 20, except at the localized portion 50. (Note that the amount of deformation of the flexible magnetic medium 28 is exaggerated, for the purposes of illustration, in the example of FIG. 2. Actual amounts of deformation are discussed in more detail herein in relation to the industrial applicability of the invention.)

In the best presently known embodiment 10 of the present invention, a deforming pin 52 passes through the stabilizer plate 20 such that the localized portion 50 of the flexible magnetic medium 28 may be deformed away from the stabilizer plate 20 by the deforming pin 50. The deforming pin 52 of the best presently known embodiment 10 has an air passage 54 therethrough such that compressed air may be provided through an air supply tube 56 for causing the localized portion 50 of the flexible magnetic medium 28 to be deformed without the deforming pin 52 actually touching the flexible magnetic medium 28, the deformation of the localized portion 50 being created by the force of the compressed air exiting the deforming pin 52.

The head element bar 46 is a conventional workpiece, known in the industry, and has thereon a plurality (thirty six, in the example of FIG. 2) of contact points 58. A like plurality (thirty six, in the example of FIG. 2) of contact wires 60 are provided on the best presently known embodiment 10 of the present invention for making electrical contact with contact points 58 of the head element bar 46 when the head element bar 46 is in place on the head bar holding assembly 44. It should be noted that, since only one set of the contact points 58 will be involved in testing at any one moment, it is not necessary that all of the contact points 58 be provided with corresponding contact wires 60, and an arrangement wherein only two or four contact wires 60 were positioned such that, as the head element bar 46 is moved, the contact points 58 would progressively come into contact with the contact wires 60 would also function to practice the present invention. The contact wires 60 are conventional spring wire contacts known in the industry for making temporary electrical contact with electrical components under test.

According to the present inventive method, a test of the head element bar 46 is accomplished substantially as follows: After the head element bar 46 is positioned manually on the head bar holding assembly 44, the movable platform 38 is positioned by means of the positioning motor 34 such that a portion of the head element bar 46 is in position opposite the deforming pin 52. Then, compressed air is applied through the air passage 54 of the deforming pin 52 to deform the localized portion 50 of the flexible magnetic medium 28, as depicted in FIG. 2. This brings the localized portion 50 of the flexible magnetic medium 28 into sufficient proximity with the head element bar such that accurate testing of the head element bar 46 can be accomplished. The exact relationship of the localized portion 50 to the head element bar 46 will depend upon variables such as type of media used, speed of rotation of the media and the type of head element bar 46 being tested. Since such spacing is easily adjusted, according to the present inventive method, by varying the pressure of the compressed air supplied through the air supply tube 56, only a small amount of experimentation should be required to adapt the magnetic media head dynamic testing apparatus 10 to any particular application or combination of variables. Specifications of the best presently known embodiment 10 of the present invention will be discussed in more detail hereinafter in relation to the industrial applicability of the invention.

During the testing of the head element bar 46, the piezo fine positioning mechanism 42 is utilized to precisely position the head element bar 46. After a portion of the head element bar 46 is tested, the compressed air supplied through the air supply tube 56 is shut off such that the localized portion 50 of the flexible magnetic medium 28 becomes coplanar with the remainder of the flexible magnetic medium 28. According to this method, the movable platform 38 may then be moved to position a new portion of the head element bar 46 without danger of the head element bar 46 crashing into the flexible magnetic medium 28. After the head element bar 46 is so repositioned, the compressed air is again provided from the air supply tube 56 through the air passage 54 such that the localized portion 50 of the flexible magnetic medium 28 is again urged toward the head element bar 46 as shown in the view of FIG. 2. This process is repeated until the entire head element bar 46 has been tested.

It should be noted that electrical and electronic control mechanisms and electronic head testing circuits to be used in conjunction with the magnetic media head dynamic testing apparatus 10 of the present invention are conventional in nature and are omitted from the views of FIG. 1 and FIG. 2 for the sake of clarity. The testing, itself, which is to be conducted is not a part of the present invention or inventive method, and it is anticipated that essentially any test which might be performed on a head in an assembled hard disk drive assembly could be readily adapted for use with the present invention.

It should further be noted that several of the process steps of the present inventive method could be accomplished either with human intervention or else entirely under machine control. It is anticipated that optical means, such as a television camera (not shown) will be used to observe the positioning of the head element bar 46 and further to observe spacing between the localized portion 50 of the flexible magnetic medium 28 and the head element bar 46. In the best presently known embodiment 10 of the present invention, control of the motor 34 and of compressed air supplied through the air supply tube 56 are accomplished under machine control. However, it may well be that allowing operator control of some or all of these functions may prove to be the most economical and/or practical alternative, at least in some applications.

Figure 3:
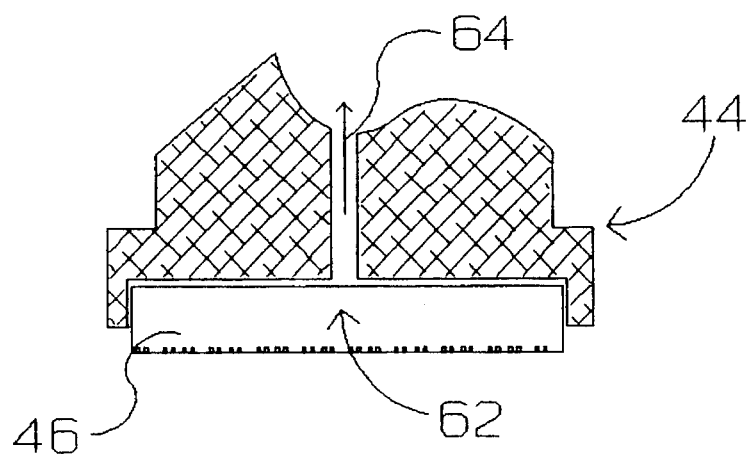
FIG. 3 is a cross sectional view of the head bar holding assembly of FIG. 2.

FIG. 3 is a cross sectional view of the head bar holding assembly 44 of FIG. 2, showing that the head element bar 46 fits into a recess 62 in the head bar holding assembly 44. Vacuum is applied through a vacuum port 64 for holding the head element bar 46 in place in the recess 62. Variations in the head bar holding assembly 44 are within the scope of the present invention. For example, several of the vacuum ports 64 might be provided to accommodate different sizes of head element bars 46. Indeed, the inventive magnetic media head dynamic testing apparatus 10 could readily be practiced with essentially any means for holding the head element bar 46 such that it could be accurately position and easily inserted and removed.

Figure 4:
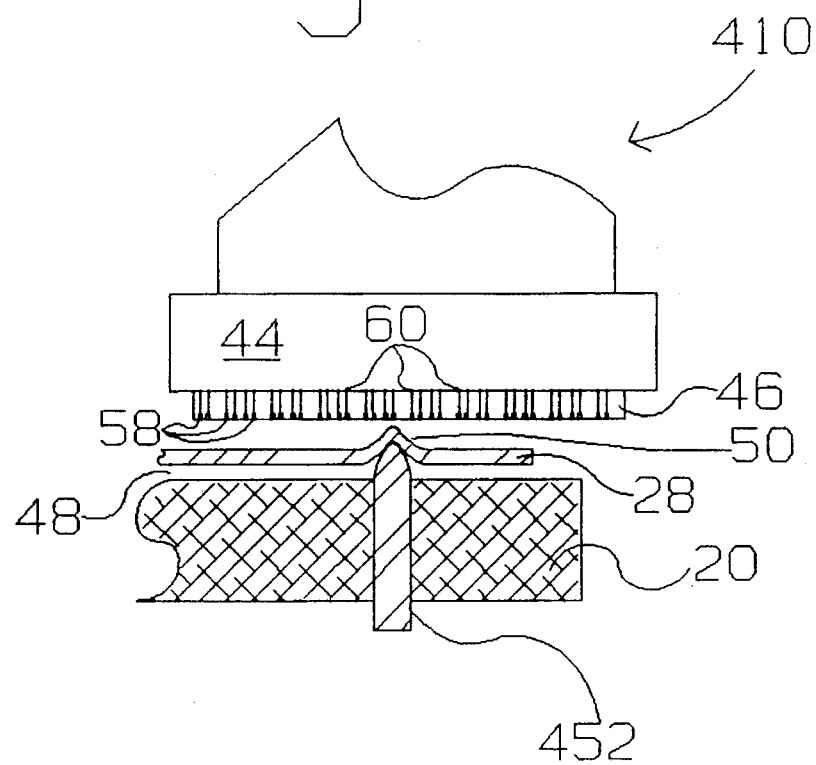
FIG. 4 is a partially cut away side elevational view, similar to the view of FIG. 2, showing the relevant portions of an equally preferred embodiment of the invention.

An equally preferred alternate embodiment of the invention is shown in FIG. 4 and is indicated therein by the general reference character 410. Those portions of the preferred alternate embodiment 410 not shown in FIG. 4 are as depicted in FIG. 1 in relation to the first preferred embodiment 10 of the invention. In FIG. 4 it can be seen that the equally preferred alternate embodiment 410 of the present invention is similar to the first preferred embodiment 10 (FIG. 2) except that an alternative deforming pin 452 of the alternate embodiment 410 is solid and formed at its apex generally in the shape of the desired deformation of the localized portion 50 of the flexible magnetic medium 28. That is, the equally preferred alternate embodiment 410 of the present invention does not use compressed air to separate the alternate deforming pin 452 from the flexible magnetic medium 28, as does the first preferred embodiment 10 to separate the deforming pin 52 from the flexible magnetic medium 28 (FIG. 2). While it may be generalized that the alternate deforming pin 452 is allowed to come into contact with the localized portion 50 of the flexible magnetic medium 28, in practice the air bearing 48 will extend to somewhat separate the alternate deforming pin 452 from the flexible magnetic medium 2e when the flexible magnetic medium 28 is spinning. The alternate deforming pin 452 of the equally preferred alternate embodiment 410 is constructed of steel, although another material such as brass or plastic could be used. Also, the alternate deforming pin 452 could be coated with Teflon™ or a similar material, or else a roller ball, or the like, could be incorporated at the apex thereof. In the equally preferred alternate embodiment 410 of the present invention, the alternate deforming pin 452 is rigidly affixed into the stabilizer plate 20, although electromechanical, pneumatic, hydraulic or other means might be used to raise and lower the alternate deforming pin 452 in relation to the stabilizer plate 20 such that the localized portion 50 of the flexible magnetic medium 28 could be optionally deformed and/or allowed to become coplanar with the remainder of the flexible magnetic medium 28 as described previously herein in relation to the inventive method and the first preferred embodiment 10 of the present invention. The degree of deformity caused to the localized portion 50 of the flexible magnetic medium 28 could also be adjusted by so moving the alternate deforming pin 452.

FIG. 5 is a cross sectional view, similar to the view of FIG. 3, depicting an alternate holding assembly 544. The alternate holding assembly 544 is similar to the head bar holding assembly 44 (FIG. 3), except that an alternate recess 562 is adapted for holding an individual slider assembly 564. As previously discussed, the slider assembly 564 is produced by dividing the head element bar 46 (FIG. 2). According to the prior art, shaping and forming of the slider assembly 564 can be accomplished either before or after dividing the head element bar 46 or else in part before and in part after. The alternate holding assembly 544 illustrates that the inventive magnetic media head dynamic testing apparatus 10 and 410 can be readily adapted for testing the individual slider assembly 564, rather than or in addition to the head element bar 46.

Various modifications can be made to the invention without altering its value or scope. For example, in addition to the several variations previously discussed herein, alternate means for positioning the head element bar 46 and/or the slider assembly 564 might be employed. Another variation might be to rearrange the magnetic media head dynamic testing apparatus 10 such that the flexible magnetic medium is oriented vertically rather than horizontally. All of the above are only some of the examples of available embodiments of the present invention. Those skilled in the art will readily observe that numerous other modifications and alterations may be made without departing from the spirit and scope of the invention. Accordingly, the above disclosure is not intended as limiting and the appended claims are to be interpreted as encompassing the entire scope of the invention.

INDUSTRIAL APPLICABILITY

The magnetic media head dynamic testing apparatus 410 of the present invention is intended to be used to test components of read and/or write heads for magnetic media data storage devices, such as the head element bar 46 or the slider assembly 546, which components are later to be assembled into completed head assemblies. While many of the operations discussed herein are described as being performable either manually or under machine control, it is expected that all or nearly all of the operations will eventually be refined to work under machine control.

Since a primary purpose of inventive magnetic media head dynamic testing apparatus 10, 410 is to reduce manufacturing costs, it is expected that each manufacturing using the device will employ a cost analysis to determine at how many stages and at which stages in their individualized process the greatest effectiveness of usage might be attained.

Although, as previously discussed herein, many variables will effect the exact configuration of the inventive magnetic media head dynamic testing apparatus 10, 410 in various applications, to aid in reducing the amount of experimentation or adaption required, the specifics of the best presently known embodiment 10 of the present invention are set forth as follows: Rotational speed of the flexible magnetic medium 20 is 3600 revolutions per minute, although experimentation has shown that the (conventional) flexible magnetic medium 28 should remain stable up to approximately 9000 revolutions per minute, should that be required. Compressed air supplied through the air passage 54 is at approximately 60 pounds per square inch (175 Kg/cm$^2$), and the diameter of the air passage is approximately 0.015 inch (9.4 mm). Deformation of the localized portion 50 of the flexible magnetic medium 28 away from the general plane of the flexible magnetic medium 28 is approximately 0.0015 mils (0.0375 μm), and the localized portion 50 is, at its closest proximity, about 0.006 inches (0.15 mm) from the head element bar 46 during testing.

It is expected, for the reasons previously discussed herein, that a substantial savings can be obtained by testing head components dynamically prior to completed assembly of the units. For these and other reasons, it is expected that the utility and industrial applicability of the invention will be both significant and long-lasting in duration.

What is claimed is:

1. A method for testing, prior to final assembly of hard disk drives, a magnetic head element of the type used for reading rigid media, comprising:

placing the magnetic head element in proximity to a flexible magnetic medium disk;

causing said flexible magnetic medium disk to move in relation to a stationary stabilizer plate;

deforming a localized portion of the flexible magnetic medium disk toward, but not into actual contact with, the magnetic head element; wherein
   said deforming is accomplished without physical contact of a solid body with said flexible magnetic medium disk; and testing the magnetic head element.

2. The method of claim 1, wherein:

electronic testing of the magnetic head element is accomplished while said localized portion of said flexible magnetic medium is deformed toward the magnetic head element.

3. The method of claim 1, wherein:

said flexible magnetic medium is a flexible magnetic medium disk; and said flexible magnetic medium is caused to spin in relation to said stabilizer plate.

4. The method of claim 1, wherein:

the magnetic head element is placed in proximity with said localized portion of said flexible magnetic medium by a positioning motor.

5. The method of claim 4, wherein:

the magnetic head element is further positioned with a piezo fine positioning apparatus.

6. A magnetic media head dynamic testing apparatus for testing, prior to final assembly of hard disk drives, a head component of the type used for reading rigid media, comprising:

a flexible magnetic medium;

medium movement means for moving said flexible magnetic medium at high speed above a stabilizer plate;

component positioning means for positioning the head component adjacent to said flexible magnetic medium; and deforming means for deforming a localized portion of said flexible magnetic medium away from the stabilizer plate and toward, but not into actual contact with, the head component; wherein said deforming means operates without physical contact of a solid body with said flexible magnetic medium.

7. The magnetic media head dynamic testing apparatus of claim 6, wherein:

said deforming means being controllable such that the localized portion of said flexible magnetic medium is controllably deformed toward the head component, and controllably allowed to return to an undeformed condition.

8. The magnetic media head dynamic testing apparatus of claim 7, wherein:

said deforming means is a deforming pin with an air passage therethrough such that air is applied through the air passage to urge the localized portion of said flexible magnetic medium toward the head component.

9. The magnetic media head dynamic testing apparatus of claim 6, wherein:

said deforming means being controllable such that the localized portion of said flexible magnetic medium is controllably deformed in a desired amount toward the head component.

10. The magnetic media head dynamic testing apparatus of claim 9, wherein:

said deforming means is a deforming pin with an air passage therethrough such that air is applied through the air passage to urge the localized portion of said flexible magnetic medium toward the head component.

11. The magnetic media head dynamic testing apparatus of claim 4, wherein:

the flexible magnetic medium is a flexible medium disk; and the flexible magnetic medium is caused to spin in relation to the stabilizer plate.

12. A magnetic media, prior to final assembly of hard disk drives, head testing apparatus for testing a head component of the type used for reading rigid media, the head testing apparatus comprising:

holding means for holding the head component;

a flexible magnetic medium;

medium motive means for moving said flexible magnetic medium in relation to the head component;

deforming means for deforming a localized portion of said flexible magnetic medium toward, but not into actual contact with, the head component; wherein said deforming means operates without physical contact of a solid body with said flexible magnetic medium.

13. The media head testing apparatus of claim 12, and further including:

a stabilizer plate adjacent to said flexible medium for stabilizing said flexible medium as said flexible medium is moved in relation to the head component.

14. The media head testing apparatus of claim 12, wherein:

said deforming means being controllable such that the amount of deformation of the localized portion of said flexible medium is variable.

15. The media head testing apparatus of claim 14, wherein:

said deforming pin includes a passage for blowing air therethrough toward said flexible medium to urge a portion of said flexible medium toward the head component.

16. The media head testing apparatus of claim 12, wherein:

said holding means is suitable for holding a head bar assembly.

17. The media head testing apparatus of claim 12, wherein:

said holding means is suitable for holding a head slider unit.

* * * * *